United States Patent
Hong (10) Patent No.: US 11,186,313 B2
(45) Date of Patent: Nov. 30, 2021

(54) APPARATUS AND METHOD FOR GENERATING STEERING WHEEL REACTION TORQUE IN SBW SYSTEM

(71) Applicant: MANDO CORPORATION, Gyeonggi-do (KR)

(72) Inventor: Seunggyu Hong, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 122 days.

(21) Appl. No.: 16/573,969

(22) Filed: Sep. 17, 2019

(65) Prior Publication Data

US 2020/0094873 A1   Mar. 26, 2020

(30) Foreign Application Priority Data

Sep. 21, 2018  (KR) .................... 10-2018-0114154

(51) Int. Cl.
*B62D 6/00* (2006.01)
(52) U.S. Cl.
CPC .................... *B62D 6/008* (2013.01)
(58) Field of Classification Search
CPC .......... B62D 6/00; B62D 6/008; B62D 6/046; B62D 6/0466
See application file for complete search history.

(56) References Cited

U.S. PATENT DOCUMENTS

| 2014/0230533 A1* | 8/2014 | Greul | B62D 6/008 73/117.02 |
| 2015/0225015 A1* | 8/2015 | Takeda | B62D 15/025 701/41 |
| 2019/0047618 A1* | 2/2019 | Hulten | B62D 6/008 |

FOREIGN PATENT DOCUMENTS

| EP | 1838566 B1 * | 2/2017 | ............. B62D 6/008 |
| EP | 3210851 A2 * | 8/2017 | ............... B62D 6/08 |
| JP | 2005-59705 | 3/2005 | |
| JP | 2006-117088 | 5/2006 | |
| JP | 2006-298276 | 11/2006 | |
| JP | 2007-55452 | 3/2007 | |
| JP | 4286834 | 7/2009 | |
| JP | 2015-98225 | 5/2015 | |
| JP | 2017-202774 | 11/2017 | |

(Continued)

OTHER PUBLICATIONS

Alaa Marouf, Mohamed Djemai, Chouki Sentouh, and Philippe Pudio, "A New Control Strategy of an Electric-Power-Assisted Steering System", IEEE Transactions on Vehicular Technology vol. 61, No. 8, Oct. 2012. (Year: 2012).*

(Continued)

*Primary Examiner* — Khoi H Tran
*Assistant Examiner* — Tristan J Greiner
(74) *Attorney, Agent, or Firm* — Ladas & Parry, LLP (57) ABSTRACT

An apparatus and method for generating steering wheel reaction torque. Steering wheel reaction torque is generated in an SBW system so as to be able to maintain constant hysteresis regardless of a steering angle or rack force. The apparatus for generating steering wheel reaction toque in an SBW system for a vehicle includes: an offset determiner determining an offset on the basis of input factors; a target reaction torque determiner determining target reaction torque on the basis of at least one of the input factors and the offset; and a reaction torque generator generating steering wheel reaction torque on the basis of the determined target reaction torque.

12 Claims, 6 Drawing Sheets

(56) References Cited

FOREIGN PATENT DOCUMENTS

| WO | WO-2006064343 A2 | * | 6/2006 | ............. | B62D 5/006 |
| WO | WO-2010144049 A1 | * | 12/2010 | ............. | B62D 6/003 |
| WO | WO-2016105316 A1 | * | 6/2016 | ............. | B62D 6/008 |

OTHER PUBLICATIONS

Office Action dated Oct. 2, 2019 for Korean Patent Application No. 10-2018-0114154 and its English machine translation by Google Translate.

Notice of Allowance dated Feb. 13, 2020 for Korean Patent Application No. 10-2018-0114154 and its English machine translation by Google Translate.

* cited by examiner

APPARATUS AND METHOD FOR GENERATING STEERING WHEEL REACTION TORQUE IN SBW SYSTEM

CROSS REFERENCE TO RELATED APPLICATION

This application claims priority from Korean Patent Application No. 10-2018-0114154, filed on Sep. 21, 2018, which is hereby incorporated by reference for all purposes as if fully set forth herein.

BACKGROUND

Field

Embodiments relate to an apparatus and method for generating steering wheel reaction torque. More particularly, embodiments relate to an apparatus and method for generating steering wheel reaction torque in an SBW system so as to be able to maintain constant hysteresis regardless of a steering angle or rack force.

Description of Related Art

Steer-by-wire (SBW) systems for vehicles are systems that steer vehicles using a motor, such as an electric motor, while a steering column or a mechanical coupling, such as a universal joint or a pinion shaft between a steering wheel and wheels, used in conventional vehicles, is removed.

Since such systems have no mechanical coupling between a steering rack gear and a steering column, adequate steering wheel reaction needs to be generated by a motor installed on a steering wheel during steering in order for a driver to gain a sensation of steering, similar to that of an existing steering system.

In existing SBW systems, steering wheel reaction torque (reaction torque to be described below may be interpreted as having the same meaning as steering wheel reaction torque) is generated through a steering feedback actuator (SFA) that is a SBW upper stage controller to enable a driver grasping a steering wheel to feel a steering wheel reaction. In this case, a difference may occur between steering wheel reaction torque generated when a driver turns a steering wheel at the midpoint at the same steering angle and steering wheel reaction torque generated when a driver restores a steering wheel to the midpoint. This difference is referred to as hysteresis of the SBW system.

In order for the driver to feel the sensation of steering similar to that of the existing steering system, a value of the aforementioned hysteresis needs to be constantly maintained in any section. However, there is a problem in that it is difficult to constantly maintain a value of hysteresis in a section in which a variation in reaction torque is large and a section in which a variation in reaction torque is small using an existing SFA determining steering wheel reaction torque on the basis of a steering angle or rack force.

BRIEF SUMMARY

Various aspects provide an apparatus and method for generating steering wheel reaction torque in an SBW system, characterized by determining an offset according to input factors such as a steering angle and rack force first, determining target reaction torque on the basis of at least one of the input factors and the offset, and generating steering wheel reaction torque on the basis of the determined target reaction torque.

According to an aspect, an apparatus for generating steering wheel reaction torque in an SBW system for a vehicle includes: an offset determiner determining an offset according to input factors, a target reaction torque determiner determining target reaction torque on the basis of at least one of the input factors and the offset, and a reaction torque generator generating steering wheel reaction torque on the basis of the target reaction torque.

According to another aspect, a method for generating steering wheel reaction torque in an SBW system for a vehicle includes: an offset determining step determining an offset according to input factors, a target reaction torque determining step determining target reaction torque on the basis of at least one of the input factors and the offset, and a reaction torque generating step generating steering wheel reaction torque on the basis of the target reaction torque.

The use of the SBW system described in the aspects can constantly maintain a value of hysteresis in a section in which a variation in reaction torque is large and a section in which a variation in reaction torque is small.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements When it is mentioned that a first element "is connected or coupled to", "contacts or overlaps" etc. a second element, should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

Hereinafter, embodiments of the present disclosure will be described in detail with reference to the drawings.

Figure 1:
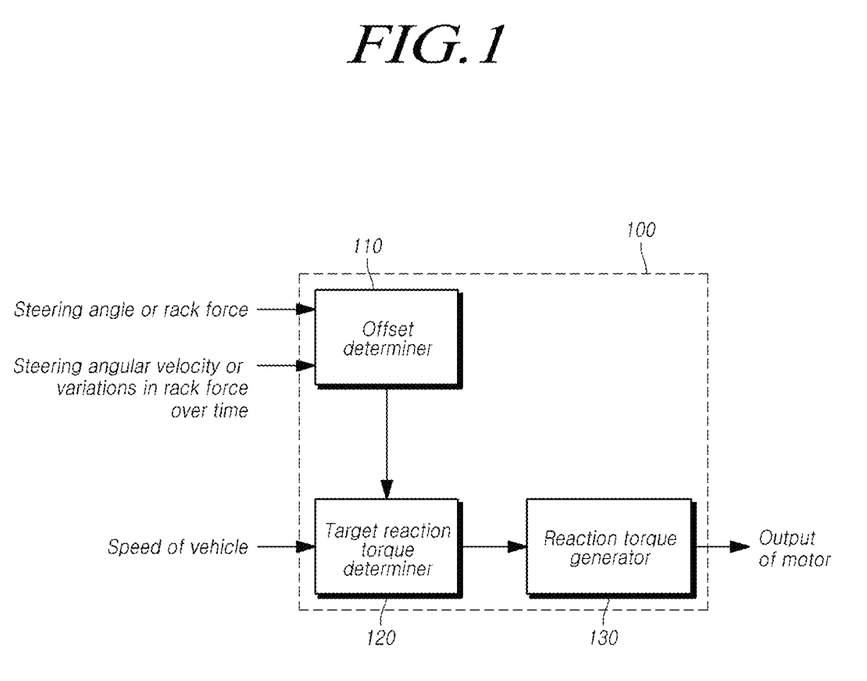
FIG. 1 is block diagram illustrating components of an apparatus for generating steering wheel reaction torque in an SBW system according to an embodiment of the present disclosure.

FIG. 1 is block diagram illustrating components of an apparatus for generating steering wheel reaction torque in an SBW system according to an embodiment of the present disclosure.

Referring to FIG. 1, an SBW system 100 of the present embodiment may include an offset determiner 110, a target reaction torque determiner 120, and a reaction torque generator 130.

The offset determiner 110 may determine an offset used to determine target reaction torque. The offset may be determined on the basis of one or more input factors.

As an example, the input factors that determine the offset may be a steering angle and a steering angular velocity. That is, the offset may be determined on the basis of the steering angle, as well as the steering angular velocity, namely variations in the steering angle over time.

As another example, the input factors that determine the offset may be rack force and variations in rack force over time.

The target reaction torque determiner 120 may determine the target reaction torque on the basis of at least one of the offset determined by the offset determiner 110 and the aforementioned input factors.

To determine the target reaction torque on the basis of at least one of the aforementioned offset and input factors, the target reaction torque determiner 120 may use, for example, a preset calculation formula. That is, a result value derived by substituting the aforementioned input factors and offset into the calculation formula may be used as a value of the target reaction torque.

As another example, the target reaction torque determiner 120 may determine a value of the target reaction torque using a reaction torque map that represents a relation of reaction torque to the input factors instead of the calculation formula.

The reaction torque map is used to determine the value of the target reaction torque according to the aforementioned input factors, the steering angle/the steering angular velocity or the rack force/the variations in the rack force.

To be specific, the target reaction torque determiner 120 may change a reference reaction torque map on the basis of the offset determined by the offset determiner 110, and then obtain a corrected reaction torque map.

An example of the concrete method of correcting the reaction torque map used to determine the target reaction torque will be described through FIGS. 2 to 4 to be described below.

Meanwhile, the target reaction torque determined by the target reaction torque determiner 120 may be additionally changed by the speed of the vehicle in addition to the aforementioned input factors and offset.

For example, since steering should be made heavy to reduce a danger of excessive steering as the speed of the vehicle increases, the value of the target reaction torque may be changed to be increased. Reversely, to make steering light as the speed of the vehicle reduces, the value of the target reaction torque may be changed to be reduced.

The reaction torque generator 130 may generate steering wheel reaction torque on the basis of the target reaction torque determined by the target reaction torque determiner 120.

The reaction torque generator 130 may generate real steering wheel reaction torque to follow the aforementioned target reaction torque. However, the reaction torque generator 130 may gradually generate reaction torque such that variations in the steering wheel reaction torque over time are lower than or equal to a preset slope value instead of immediately generating steering wheel reaction torque as high as a magnitude of the aforementioned target reaction torque.

An example of the method of gradually generating the reaction torque such that the variations in the steering wheel reaction torque over time are lower than or equal to the preset slope value in FIG. 5 to be described below will be described.

Figure 2:
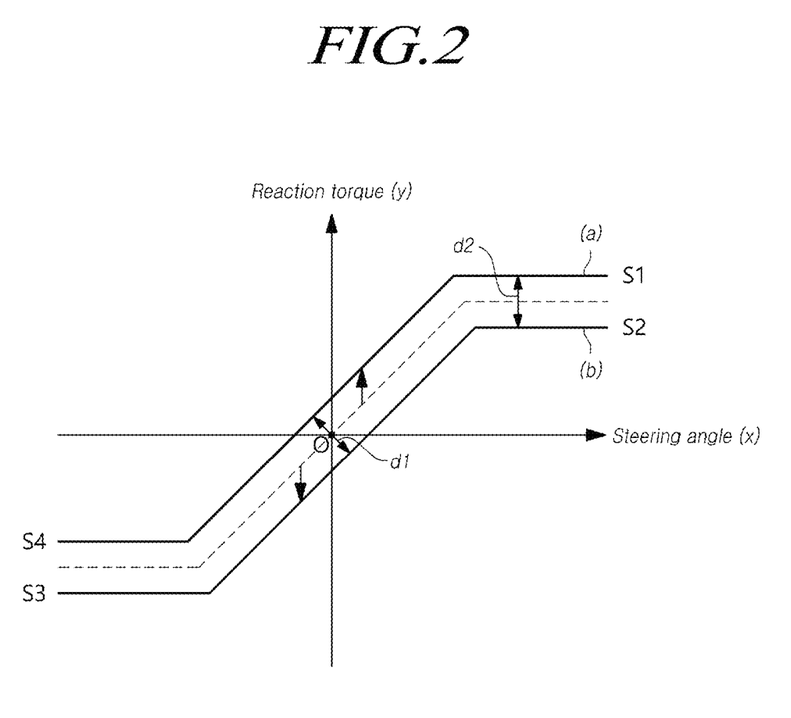
FIG. 2 is a view illustrating a reaction torque map used to generate reaction torque in an existing SBW system.

FIG. 2 is a view illustrating a reaction torque map used to generate reaction torque in an existing SBW system.

The reaction torque map is expressed as a graph of reaction torque according to a map input value, for example a steering angle or rack force. In the graph expressed in FIG. 2, the map input value, for example the steering angle or the rack force is set for the x-axis, and the reaction torque is set for the y-axis.

In this case, the reaction toque is target reaction torque, and the SBW system has control such that real reaction torque applied to a steering wheel follows the target reaction torque.

In this case, signs of the map input value and a value of the reaction torque refer to directions. For example, a sign + means that the steering angle or the rack force acts in the right direction, and a sign − means that the steering angle or the rack force acts in the left direction. The map input value and an absolute value of the reaction torque refer to magnitudes. This is equally applied to graphs of FIGS. 3 and 4.

A graph expressed in FIG. 2 by a dotted line represents a reference reaction torque map. The reference reaction torque map may be configured such that the reaction torque increases in proportion to the map input value within a range of a constant map input value including a meaning that the reference reaction torque map refers to a point at which the midpoint is O and a magnitude of the map input value is 0, and be configured to generate constant reaction torque regardless of the map input value beyond a range of the aforementioned steering angle.

In the existing SBW system, a reaction torque map may be determined in the manner of adding additional reaction toque calculated using the aforementioned input factors, for example the steering angle and the steering angular velocity on the reference reaction torque map. For example, in a case in which the steering angular velocity is +, a reaction torque map to which positive additional reaction torque like (a) of FIG. 2 is added may be used. In contrast, in a case in which the steering angular velocity is −, a reaction torque map to which negative additional reaction toque like (b) of FIG. 2 is added may be used.

Referring to (a) and (b) of FIG. 2, hysteresis characteristics of steering wheel reaction torque can be represented. That is, the steering wheel reaction torque is S1 in a case in which a steering wheel is turned to the rightmost side, and then is required from S2 to S3 when the steering wheel begins to be turned to the left side. Further, the steering wheel reaction torque is S3 in a case in which a steering wheel is turned to the leftmost side, and then is required from S4 to S1 when the steering wheel begins to be turned to the right side. That is, when the steering wheel is turned, the steering wheel reaction torque shows along a constant path that connects S1, S2, S3, and S4.

In this case, (a) and (b) of FIG. 2 are graphs that move only to the y-axis on the graph showing the reference reaction torque map. In this case, intervals between (a) and (b) of FIG. 2 and the reference reaction torque map within a range of the constant map input value including the midpoint are smaller than those between (a) and (b) of FIG. 2 and the reference reaction torque map beyond a range of the aforementioned map input value.

To be specific, the intervals between (a) and (b) of FIG. 2 and the reference reaction torque map within the range of the constant map input value including the midpoint are smaller than differences between y-intercepts of (a) and (b) of FIG. 2 and the reference reaction torque map, and the intervals between (a) and (b) of FIG. 2 and the reference reaction torque map beyond the range of the aforementioned map input value are the differences between the y-intercepts of (a) and (b) of FIG. 2 and the reference reaction torque map. That is, in the case in which the graphs move only to the y-axis, if the interval within the range of the constant map input value including the midpoint is d1 and the interval beyond the range of the aforementioned map input value is d2, it is shown that d2 has a larger value than d1. Therefore, a value of hysteresis is not constant in a section in which a variation in reaction torque is large and a section in which a variation in reaction torque is small.

That is, a difference exists between hysteresis within the range of the constant map input value including the midpoint and hysteresis beyond the range of the aforementioned map input value.

Meanwhile, the description in FIG. 2 has been made on the basis of the case in which the map input value is the steering angle, but the same way may be applied to the case in which the map input value is the rack force instead of the steering angle.

Figure 3:
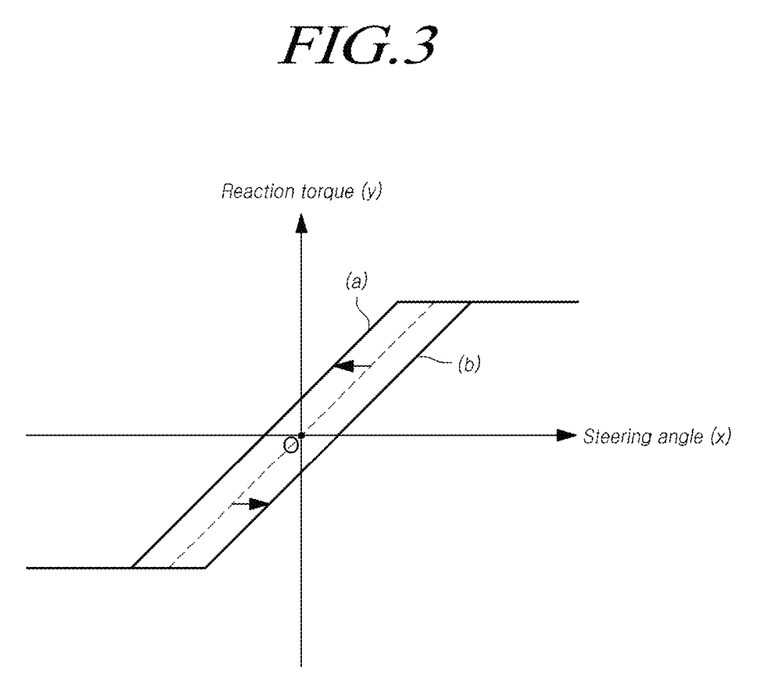
FIG. 3 is a view illustrating an example of the process of correcting a reaction torque map according to an offset in the SBW system according to the present embodiment.

FIG. 3 is a view illustrating an example of the process of correcting a reaction torque map according to an offset in the SBW system according to the present embodiment.

A graph expressed in FIG. 3 by a dotted line represents a reference reaction torque map. As in FIG. 2, the reference reaction torque map may be configured such that the reaction torque increases in proportion to the map input value within the range of the constant map input value including the midpoint, for example, within a range of a steering angle from −180° to 180°, and be configured to generate constant reaction torque regardless of the map input value beyond the range of the aforementioned map input value.

In the SBW system described in the present embodiment, the reaction torque map determining the target reaction torque according to the input factors can be corrected on the basis of the determined offset.

It is taken that the map input value of the x-axis in FIG. 3 is the steering angle. In FIG. 3, the corrected reaction torque map is a graph on which the reference reaction torque map moves in a direction of the x-axis.

For example, in a case in which a steering angular velocity is +, the reaction torque map may be corrected as in (a) of FIG. 3. In this case, the offset is a negative value, the reaction torque map is corrected such that a value of the x-intercept of the reaction torque map becomes negative.

In contrast, in a case in which the steering angular velocity is −, the reaction torque map may be corrected as in (b) of FIG. 3. In this case, the offset is a positive value, the reaction torque map is corrected such that the value of the x-intercept of the reaction torque map becomes positive.

As an example, an offset value may be determined such that the hysteresis characteristics of the steering wheel reaction torque on the reaction torque map represent a constant interval with respect to the reference reaction torque within a steerable range.

In this way, the reaction torque map may be determined in the way of adding additional reaction torque calculated using a steering angle and a steering angular velocity to (a) and (b) of FIG. 3 in which the reference reaction torque map moves to the x-axis. The detailed contents will be described in FIG. 4.

Figure 4:
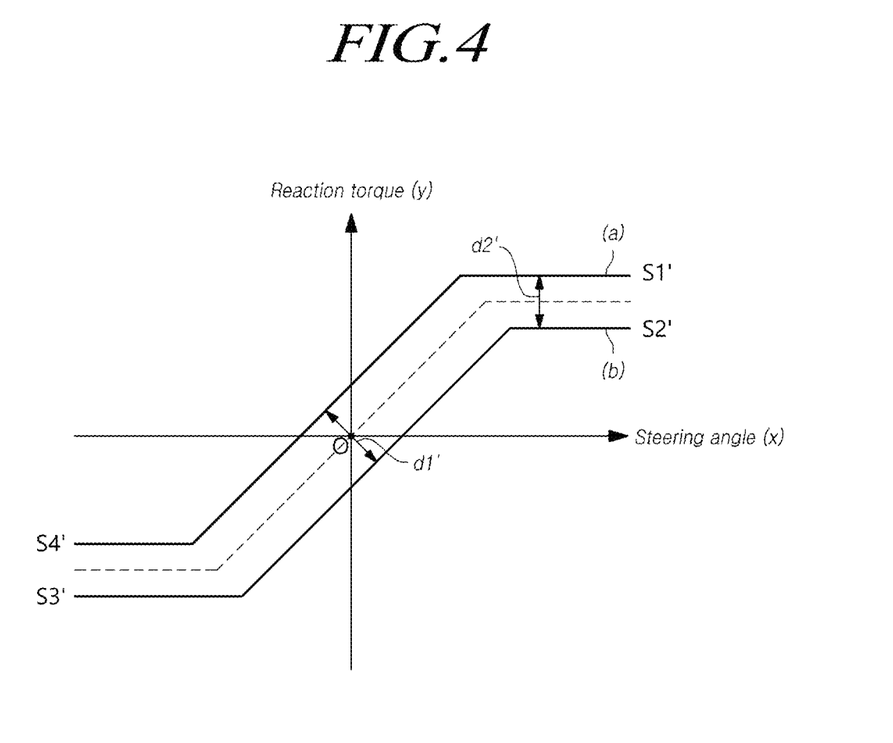
FIG. 4 is a view illustrating a reaction torque map used to generate reaction torque in the SBW system according to the present embodiment.

FIG. 4 is a view illustrating a reaction torque map used to generate reaction torque in the SBW system according to the present embodiment.

(a) of FIG. 4 is a reaction torque map determined in the way of adding additional reaction torque calculated using a steering angle and a steering angular velocity to (a) of FIG. 3.

(b) of FIG. 4 is a reaction torque map determined in the way of adding additional reaction torque calculated using a steering angle and a steering angular velocity to (b) of FIG. 3.

When (a) and (b) of FIG. 4 are compared with (a) and (b) of FIG. 2, a difference between an interval between (a) and (b) of FIG. 4 within a range of the constant steering angle including the midpoint and an interval between (a) and (b) of FIG. 4 beyond a range of the aforementioned steering angle is smaller than the case of FIG. 2. That is, it can be confirmed that a difference between hysteresis within the range of the constant steering angle including the midpoint and hysteresis beyond the range of the aforementioned steering angle is smaller than the case of FIG. 2.

To be specific, as illustrated in FIG. 3, in the case in which the steering wheel reaction torque map moves to the x-axis by applying the offset value, d2 that is the interval beyond the range of the aforementioned map input value can be constantly maintained. That is, d2' illustrated in FIG. 4 has the same value as d2. However, in a case in which an interval within a range of the constant steering angle including the midpoint is d1', (a) of FIG. 4 moves to the left side, and (b) of FIG. 4 moves to the right side, so that d1' becomes larger than d1. Therefore, in a case in which the offset value is determined such that d1' has the same value as d2', the steering wheel reaction torque map may be generated at the same intervals with respect to the reference reaction torque in the whole section. Accordingly, the value of hysteresis can be constantly maintained in the section in which the variation in the reaction torque is large and the section in which the variation in the reaction torque is small.

As another example, a function capable of adjusting the offset value may be further provided to adjust an optimal sensation of steering according to a driver. That is, a form of a new steering wheel reaction torque map that properly adjusts the offset value to connect hysteresis curves S1', S2', S3' and S4' of the steering wheel reaction torque may be adjusted according to the driver.

Meanwhile, the method of correcting the reaction torque map on the basis of the steering angle and the steering angular velocity has been described in FIGS. 3 and 4, but the reaction torque map may be corrected in the same method in a case in which rack force is used instead of the steering angle and variations in the rack force over time are used instead of the steering angular velocity.

Figure 5:
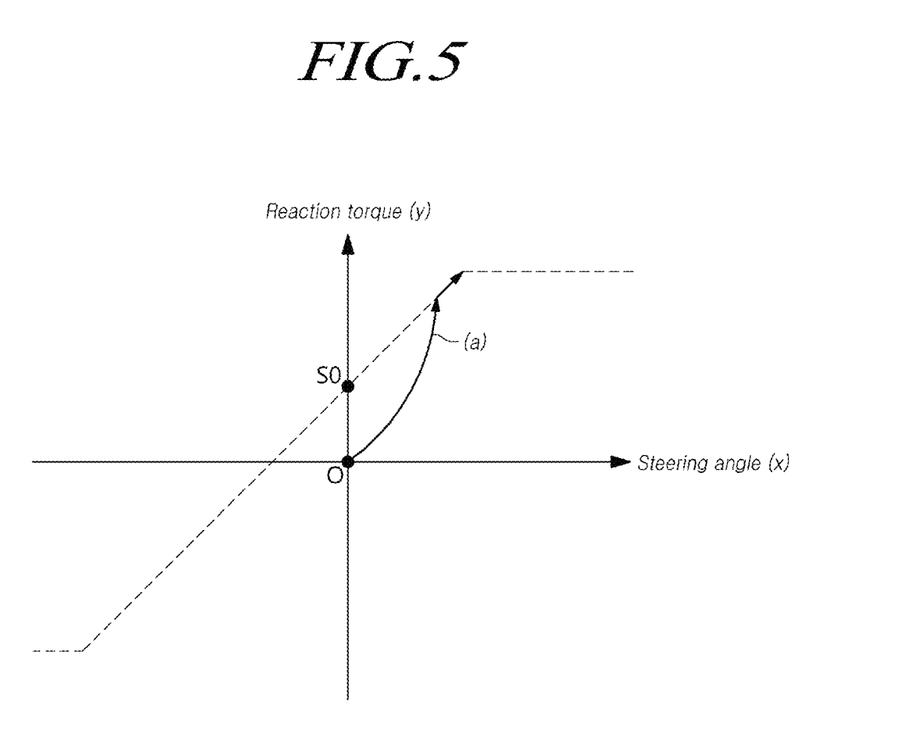
FIG. 5 is a view illustrating an example in which real reaction torque generated on the basis of a reaction torque map in the SBW system according to the present embodiment is changed.

FIG. 5 is a view illustrating an example in which real reaction torque generated on the basis of a reaction torque map in the SBW system according to the present embodiment is changed.

Referring to FIG. 5, a graph indicated by a dotted line is a graph that represents a reaction torque map, that is, target reaction torque according to a map input value, for example, a steering angle or rack force.

If real steering wheel reaction torque is immediately changed in a direction in which it follows a reaction torque map such as a direction of S0 in a state in which a current map input value is 0, there is a problem that a driver immediately feels an abrupt change in steering wheel reaction when moving a steering wheel. In this case, the driver can recognize that the steering wheel suddenly becomes heavy or light.

Therefore, a slope on the graph, that is, a magnitude of a variation of reaction torque against a map input value is restricted to be less than or equal to a preset slope value, and thereby there is a need to cause a driver to feel as if a steering wheel reaction applied from a steering wheel is not abruptly changed but is gradually changed.

Expressed this as a graph, when a steering wheel is moved, for example, in a direction in which it increases a steering angle in a state in which it is located at the midpoint, real steering wheel reaction torque applied to the steering wheel may be changed in a curve form like (a) of FIG. 5.

However, since the magnitude of the variation of the reaction torque against the map input value only has to be maintained to be less than or equal to the preset slope value, a concrete shape of a curve that expresses a change in reaction torque can be variously changed. For example, the curve that expresses the change in reaction torque is expressed in an exponent form in (a) of FIG. 5, but may be expressed in a logarithm form.

If the steering wheel reaction applied actually to the steering wheel becomes the same as the target reaction torque on the reaction torque map, the steering wheel reaction torque applied actually to the steering wheel since then can be changed along the reaction torque map.

Meanwhile, the description in FIG. 5 has been made on the basis of the case in which the map input value is the steering angle, but the same way may be applied to the case in which the map input value is the rack force instead of the steering angle.

Figure 6:
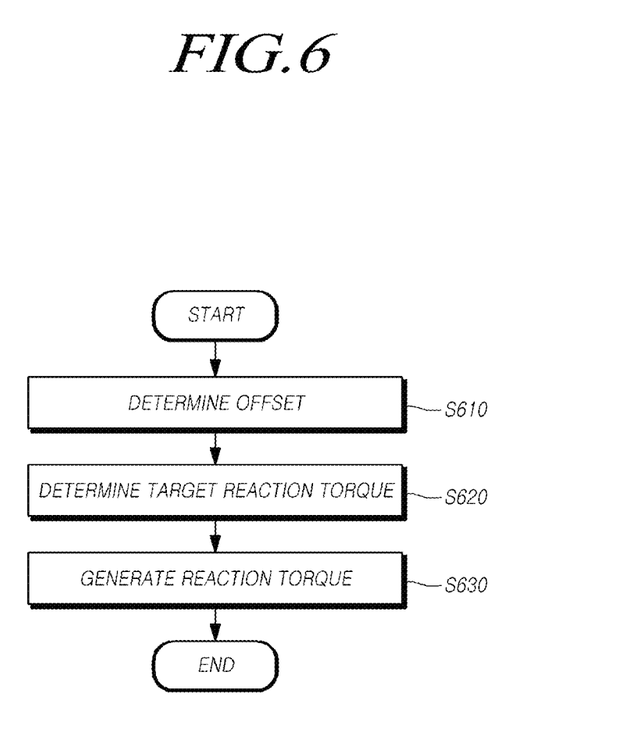
FIG. 6 is a flow chart illustrating a method for generating steering wheel reaction torque in the SBW system according to the present embodiment.

FIG. 6 is a flow chart illustrating a method for generating steering wheel reaction torque in the SBW system according to the present embodiment.

Hereinafter, an example in which the method is performed by the apparatus 100 for steering wheel reaction torque described in FIG. 1 will be described.

Referring to FIG. 6, the method may include an offset determining step of determining an offset on the basis of input factors in step S610.

In this case, as described in FIG. 1, the input factors for determining the offset that is determined in the offset determining step may be steering angle and a steering angular velocity as an example, or may be rack force and variations in the rack force over time as another example.

Further, in step S620, the method may include a target reaction torque determining step of determining target reaction torque on the basis of at least one of the offset and the input factors that are determined in step S610.

In a case in which a reaction torque map is used to determine the target reaction torque, a process of correcting the reaction torque map according to the input factors is based on the processes described in FIGS. 2 to 4. Meanwhile, a value of the aforementioned target reaction torque may be determined in proportion to a speed of a vehicle.

Further, the method may include a reaction torque generating step of generating steering wheel reaction torque on the basis of the target reaction torque in step S630.

In this case, as described in FIG. 5, instead of immediately changing real steering wheel reaction torque into a value on the reaction torque map, a magnitude of a variation of reaction torque may be restricted to be less than or equal to a preset slope value in order to cause a driver to feel as if a steering wheel reaction applied from a steering wheel is gradually changed.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An apparatus for generating steering wheel reaction torque in a steer-by-wire (SBW) system for a vehicle, the apparatus comprising:
    an offset determiner determining an offset based on input factors;
    a target reaction torque determiner determining target steering wheel reaction torque based on at least one of the input factors and the offset determined based on the input factors; and
    a reaction torque generator generating steering wheel reaction torque based on the target steering wheel reaction torque,
    wherein the reaction torque generator is restricted such that variations in the steering wheel reaction torque over time are lower than or equal to a preset slope value.

2. The apparatus according to claim 1, wherein the input factors are a steering angle and a steering angular velocity.

3. The apparatus according to claim 1, wherein the input factors are rack force and variations in the rack force over time.

4. The apparatus according to claim 1, wherein the target reaction torque determiner determines the target steering wheel reaction torque on the basis of a reaction torque map that stores a relation of the steering wheel reaction torque to the input factors.

5. The apparatus according to claim 4, wherein:
the steering wheel reaction torque has hysteresis characteristics; and
the offset determiner determines the offset based on the input factors such that the hysteresis characteristics of the steering wheel reaction torque on the reaction torque map represent a constant interval with respect to reference reaction torque within a steerable range.

6. The apparatus according to claim 1, wherein a magnitude of the target steering wheel reaction torque is proportional to a speed of the vehicle.

7. A method for generating steering wheel reaction torque in an SBW system for a vehicle, the method comprising:
determining an offset based on input factors;
determining target steering wheel reaction torque on the basis of at least one of the input factors and the offset determined based on the input factors; and
generating steering wheel reaction torque based on the target steering wheel reaction torque,
generating of the steering wheel reaction torque is restricted such that variations in the steering wheel reaction torque over time is lower than or equal to a preset slope value.

8. The method according to claim 7, wherein the input factors are a steering angle and a steering angular velocity.

9. The method according to claim 7, wherein the input factors are rack force and variations in the rack force over time.

10. The method according to claim 7, wherein the determining of the target steering wheel reaction torque comprises determining the target steering wheel reaction torque based on a reaction torque map that stores a relationship of the steering wheel reaction torque to the input factors.

11. The method according to claim 10, wherein:
the steering wheel reaction torque has hysteresis characteristics; and
the determining of the offset comprises determining the offset determined based on the input factors such that the hysteresis characteristics of the steering wheel reaction torque on the reaction torque map represent a constant interval with respect to reference reaction torque within a steerable range.

12. The method according to claim 7, wherein a magnitude of the target steering wheel reaction torque is proportional to a speed of the vehicle.

* * * * *